(12) United States Patent
Wong et al.

(10) Patent No.: US 8,566,855 B2
(45) Date of Patent: Oct. 22, 2013

(54) AUDIOVISUAL USER INTERFACE BASED ON LEARNED USER PREFERENCES

(75) Inventors: Ling Jun Wong, Esconido, CA (US); Victor Carvajal, San Marcos, CA (US); Jaime Chee, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1009 days.

(21) Appl. No.: 12/326,681

(22) Filed: Dec. 2, 2008

(65) Prior Publication Data
US 2010/0138867 A1    Jun. 3, 2010

(51) Int. Cl.
*H04N 5/445* (2011.01)

(52) U.S. Cl.
USPC .............................. 725/9; 725/46

(58) Field of Classification Search
None
See application file for complete search history.

(56) References Cited

U.S. PATENT DOCUMENTS

| | | | |
|---|---|---|---|
| 5,727,174 A | 3/1998 | Aparicio, IV et al. | |
| 6,300,950 B1 | 10/2001 | Clark et al. | |
| 7,024,626 B2 | 4/2006 | Ko | |
| 7,917,583 B2* | 3/2011 | Angiolillo et al. | 709/204 |
| 2002/0138836 A1* | 9/2002 | Zimmerman | 725/46 |
| 2002/0199193 A1 | 12/2002 | Gogoi et al. | |
| 2003/0084448 A1* | 5/2003 | Soundararajan | 725/46 |
| 2003/0226888 A1* | 12/2003 | Wiggins | 235/375 |
| 2004/0221308 A1* | 11/2004 | Cuttner et al. | 725/46 |
| 2005/0066350 A1* | 3/2005 | Meuleman | 725/10 |
| 2005/0086692 A1* | 4/2005 | Dudkiewicz et al. | 725/46 |
| 2005/0120366 A1* | 6/2005 | Thurbon | 725/9 |
| 2006/0161952 A1* | 7/2006 | Herz et al. | 725/46 |
| 2007/0083883 A1* | 4/2007 | Deng | 725/19 |
| 2007/0157241 A1* | 7/2007 | Walker | 725/46 |
| 2007/0266021 A1 | 11/2007 | Aravamudan et al. | |
| 2008/0059422 A1 | 3/2008 | Tenni et al. | |
| 2008/0155602 A1 | 6/2008 | Collet et al. | |
| 2008/0155627 A1* | 6/2008 | O'Connor et al. | 725/109 |
| 2011/0179435 A1* | 7/2011 | Cordray et al. | 725/9 |
| 2011/0314499 A1* | 12/2011 | Alba et al. | 725/40 |
| 2012/0011530 A1* | 1/2012 | Bentolila et al. | 725/14 |
| 2012/0192218 A1* | 7/2012 | Schwesinger et al. | 725/21 |

FOREIGN PATENT DOCUMENTS

JP    2005-78627    3/2005

OTHER PUBLICATIONS

Lightner et al. User preference for product information in remote purchase environments. J. Electronic Commerce Res., vol. 3, No. 3, pp. 174-186 (2002).

(Continued)

*Primary Examiner* — Vivek Srivastava
*Assistant Examiner* — Rong Le
(74) *Attorney, Agent, or Firm* — John P. O'Banion

(57) ABSTRACT

A method and apparatus for providing an audiovisual user interface based on learned user preferences is described. In one implementation, the method involves collecting a set of user preferences for a user; providing a metadata stream associated with an audiovisual input; comparing elements within the metadata stream with the set of user preferences to form a comparison; and outputting a message to the user if the comparison indicates that the metadata stream matches one or more elements of the set of user preferences. The message may be output either acoustically or visually, and may relate to the audiovisual input, which may be audio, video, or both audio and video. The audiovisual input may be blocked based on a restricted message, and may be accessed upon a successful password query.

22 Claims, 8 Drawing Sheets

(56) References Cited

OTHER PUBLICATIONS

Rich et al. DiamondHelp: A graphical user interface framework for human-computer collaboration. Mitsubishi Electric Research Laboratories, Dec. 2004, available at <http://www.merl.com/reports/docs/TR2004-114.pdf>.

ISA/KR, International Search Report and Written Opinion for counterpart PCT International Patent Application PCT/US2009/065478, issued Jul. 14, 2010.

Instituto Mexicano de la Propiedad Industrial (Mexican Patent Office) Office Action issued on Jul. 27, 2012 for related Mexico Patent Application No. MX/a/2011/004986, English-language translation (pp. 1-3), claims examined (pp. 4-6) and original OA in Spanish language (pp. 7-8) pp. 1-8. The reference cited in this OA was submitted in prior IDS filed on Sep. 22, 2010.

European Patent Office, Supplementary European Search Report (pp. 1-11) issued on Apr. 16, 2013 for corresponding European Patent Application EP 09 83 0882, with claims searched (pp. 12-14) pp. 1-14.

Ferman, A. M., et al., "Multimedia content recommendation engine with automatic inference of user preferences," Proceedings of the 2003 International Conference on Image Processing, Cat. No. 03CH37429, Barcelona, Spain, IEEE Piscataway, NJ, USA, vol. 3, Sep. 14, 2003, pp. 49-52.

Japanese Patent Office, English Translation of Japanese Office Action (pp. 1-2) issued on Jan. 24, 2013 for corresponding Japanese Patent Application No. P2011-538645, with claims examined (pp. 3-6) and original office action in Japanese (pp. 7-9) pp. 1-9.

* cited by examiner

AUDIOVISUAL USER INTERFACE BASED ON LEARNED USER PREFERENCES

STATEMENT REGARDING FEDERALLY SPONSORED RESEARCH OR DEVELOPMENT

Not Applicable

CROSS-REFERENCE TO RELATED APPLICATIONS

Not Applicable

INCORPORATION-BY-REFERENCE OF MATERIAL SUBMITTED ON A COMPACT DISC

Not Applicable

BACKGROUND OF THE INVENTION

1. Field of the Invention

This invention generally relates to user interfaces, and more particularly to a user interface that through learning assimilates user preferences.

2. Description of Related Art

Traditional user interfaces are well known in the contexts of Video Cassette Recording (VCR) and Digital Video Recording (DVR), where a programming schedule of upcoming programming content is displayed. Similarly, audio prompting in the customer service and other business segments of a variety of industries are well known (such prompt sequence usually starts with "Press 1 for English", or "Press 1 for touch-tone dialing"). XM® and Sirius® satellite radio systems typically use a visual interface (typically a list of stations or upcoming events) to select audio programming.

However, what appears to be lacking is a user interface that learns from prior user interactions. Such an interface would facilitate user interactions, and reduce the frustrations typically encountered when using such non-learning systems.

BRIEF SUMMARY OF THE INVENTION

An aspect of the invention is a method of interacting with a user, comprising: collecting a set of user preferences for a user; providing a metadata stream associated with an audiovisual input; comparing the metadata stream with the set of user preferences to form a comparison; and outputting a message to the user if the comparison indicates that the metadata stream matches one or more elements of the set of user preferences. The metadata stream may comprise direct metadata associated and conveyed with content programming (audio, video, or audiovisual content), or may be processed from audio, video, or both audio and video streams for a particular program being accessed. If an internet connection is present, additional metadata may be downloaded from a remote server relating to the particular content being accessed.

By accessing, we generally mean that a strictly video program is viewed, an audio program is heard, and an audiovisual program may be both seen and heard by a user. Thus, the invention is applicable to those who are deaf or blind, or have those senses significantly impaired.

In another aspect of the invention, the user may perceive the message acoustically or visually, or both acoustically and visually, or visually by viewing a displayed text bubble. Any combination of these methods may be used.

The method of collecting the set of user preferences for the user may comprise: determining a percentage of time the audiovisual input was perceived by the user prior to changing to a different audiovisual input. The amount of time viewed may be calculated by allocating a time variable to each channel asset (typically a song for an audio asset, a slide show for a strictly video asset, and a movie for an audiovisual asset), and incrementing the time while each channel is being accessed by using a clock or other timing source.

Alternatively, interrupt programming may be used to store a start of use time, and an end of use, from which an increment of time may be added to the time variable. In this aspect, a clock may be used to read the time. In this manner, a plurality of channels may be monitored until the particular program has terminated. When the channel has terminated, the total time the user has accessed the program may be divided by the total time the program was available.

The percentage of time the audiovisual input was accessed may be calculated by dividing an amount of time that the audiovisual input was perceived by the user by a total length of time the audiovisual input was available. It may be determined that the user was actually perceiving the input by determining that actions have occurred on the part of the user within a certain period of time. For instance, as audiovisual commercials occur with very frequent regularity, the user muting the device, or otherwise changing the volume, or changing the channel, could be used to indicate that the user is actually physically present. This may be useful for calculating the total amount of time a particular user has been at an entertainment device, such as a TV. In this case, a parent may choose to limit the amount of time a particular child may use the TV over a period of time, regardless of the content viewed.

The perception by the user may be: a physically present perception by the user, a not necessarily physically present perception by the user, or a mixture. It may be inferred that a user is not really physically present when a substantially long time has occurred since the last user input. For instance, if a user is viewing a movie of three hours length, and makes no input for the entire three hours, it may be implied that the user was not actively accessing the program. Few people can sit still without taking a break that long. Such behavior is uncommon, and may be used in a rating algorithm to discard any such rating as unreliable. This behavior may be exemplified by a viewer going to sleep or otherwise becoming occupied with another activity.

The percentage of time the audiovisual input was perceived may be maintained for one or more concurrently available audiovisual inputs, thereby providing for partial perceiving of the audiovisual inputs. Thus, if a user were intent on viewing two or more programs simultaneously, either with split screen or by channel flipping (frequent changing of channels), the portions spent on the particular audiovisual streams could be used as an indication of relative preference. This may be used further to infer, with past user preferences, that if a user has already viewed a particular program, and rated it highly, that when the program was again shown while overlapping with another different program, if the other different program was viewed more than the highly rated program, then it might have assigned to it the same rating or higher than the particular program.

Perception by the user may be by viewing an active window in a potentially multi-windowed device. In a typical multi-windowed device, some indication is made of the window that is active. This may be the sound (audio stream) associated with the active window, subtitles or other closed captioning, highlighting of the window, or impressing a highlighted box or other graphic indicating at least some of the window.

The active window in the potentially multi-windowed device may also be just a single window with overlays. In this instance, a television set may only have the ability to display one audiovisual input, however, text boxes may be superimposed over the audiovisual display in the overlay layer. In such a context, it may be taken that the text boxes would be the active window when highlighted, and the background programming the active window otherwise. This might be the case when a programming guide is viewed, and a wandering widget is brought into existence obscuring the programming guide. In such an instance, it would be taken that the wandering widget object would be the active window. Thus, input directed to the active window would be passed to the wandering widget object.

The audiovisual input may be selected from a group of audiovisual inputs consisting of: an audio input, a video input, a video input with an associated audio input (such as a typical movie), an audio input with a corresponding video display (such as a radio or other audio program), and one or more of the foregoing. Thus, it is envisioned that traditional television, traditional radio, slide shows with music, audio programming with associated video, or combinations of the foregoing might be used as suitable audiovisual inputs. Each of these inputs has an associated information stream, so an audio input has an audio stream, video input a video stream, and an audiovisual input may have an audio stream, video stream. All inputs may have an associated metadata stream that is either superimposed upon the input stream, or substantially contemporaneously transmitted with the input stream. The metadata stream may include a description of the programming content.

The input metadata stream may comprise a closed caption data stream for the audiovisual input. Thus, the text of the specific program may be one component of the metadata stream of the program. For instance, in the 2008 Beijing Olympics, the word "Phelps" occurs quite frequently in the swimming competitions, and consequently in the closed captioning of the programming. Thus, a search for "Phelps" in a database of previously viewed user database would give rise to recommendations of these various swimming competitions in upcoming programs that have this search term present.

The metadata stream may comprise a speech recognition output stream for an audio component of the audiovisual input. When there is no closed captioning present, a speech recognition component may be used to generate the closed captioning, thus providing input to the metadata stream as previously described. Although this may not quite be a contemporaneous device, it would appear feasible with sufficient processing power.

The metadata stream may comprise a video recognition output stream for a video component of the audiovisual input. Thus, if a face of Phelps were recognized in a video segment, then the metadata may have added to it the term "Phelps".

The method of interacting with a user may comprise: using the percentage of time the audiovisual input was perceived by the user to select a binned segment of the user preferences; and inputting the metadata associated with the audiovisual input into the binned attribute within the user preference database. These binned attributes may comprise a 5-star, 3-star, or 0-star respectively associated with highly liked, partially liked, and disliked programming content. Finer binning may also be used at the expense of increased complexity in the user preferences, and greater memory storage requirements.

An additional bin may be a bin that is Restricted. Such a bin may be particular content unsuitable for a small child.

The selecting of the binned attribute may comprise: allowing the user to override the binned attribute. Thus, if the previous bin attribute was selected based on a percentage of time a user accessed the program, regardless of the bin selection otherwise automatically made, the user may instead select another bin attribute. An example of this may be that the user watched an entire movie start to finish, which resulted in an assignment of "highly liked" or the 5-star bin. Upon later reflection, the user may determine that while it was acceptable to watch this movie once, he or she never wanted to see it again, resulting in a "disliked" or 0-star rating.

The method of interacting with a user may comprise: loading a list of assets available for user perception, where each of the assets has an independent metadata stream; and comparing at least one of the metadata streams of the assets with the set of preferences for the user to create one or more user recommendations. For instance, in a programming guide with a long list (some new cable stations allow 999 channels, and internet programming may have a much wider programming ability) of available content, the screen view of the currently listed programs may have their metadata downloaded. The metadata for each of the currently listed programs (even those perhaps not initially displayed in a guide list) is then compared to those found in the user preference database. If one of the metadata elements for a particular program corresponds to an element in the user preference database, then the corresponding particular program having the metadata element would be recommended with the user preference rating level of the common user preference term.

Thus, when a highly liked program is shown on a programming guide, a wandering widget may be invoked to indicate that a particular program appears to be highly liked. The programming guide may be made to scroll through the entire guide in sequential fashion, serially showing the highly liked programs.

The user recommendations may be created by: ordering the one or more user recommendations; and forming the message regarding the audiovisual input corresponding to the user recommendation. By ordering, it is meant that the list of messages sorted into an ascending or descending list, typically with the most preferred programming occurring first.

In another aspect of the invention, an audiovisual device may comprise: an audio, video, or audiovisual output device capable of receiving and processing a respective audio, video, or audiovisual stream; means for processing an associated metadata stream associated with a respective audio, video, or audiovisual stream; means for generating user preferences; and means for outputting to a user, one or more messages based on one or more comparisons of the user preferences and associated metadata stream.

In the audiovisual device above, the means for outputting may comprise: a wandering widget object that fades into existence when invoked to communicate one or more messages to the user.

The method of interacting with a user may comprise: ordering the one or more user recommendations; and forming the message regarding the audiovisual input corresponding to the user recommendation as a restriction message. The restriction message may indicate the suitable audience for the particular program, such as NC-17, PG-13, particular children, etc.

The audiovisual input that corresponds to a restriction message may be blocked from access, thereby forming a blocked input.

Such blocked input may be released upon a successful user response to a password query. This release may be temporary in nature, or permanent for a particular program. Otherwise, the release may be for programming such as PG-13 when a parent believes the child becomes sufficiently mature to understand the programming.

A user preference apparatus may comprise the methods described above.

In another embodiment, an audiovisual device may comprise: a. an audio, video, or audiovisual output device capable of receiving and processing a respective audio, video, or audiovisual input signal; b. means for processing an associated metadata stream associated with the respective audio, video, or audiovisual input signal; c. means for generating user preferences; and d. means for outputting to a user, one or more messages based on one or more comparisons of the user preferences and associated metadata stream.

The means for outputting may comprise: a wandering widget that fades into existence when one or more messages are to be communicated to the user. The means for blocking the respective audio, video, or audiovisual input signal may be based on one or more of the messages.

The means for selectively unblocking the blocked respective audio, video, or audiovisual input signal may be based on a successful password query.

The methods above may be stored on a computer readable medium comprising a programming executable capable of being performed on a computer.

A user preference apparatus may comprise the methods disclosed above.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a flow chart of an initialization sequence for inputting an asset list, reading metadata associated with each entry of the asset list, and comparing the metadata associated with each entry of the asset list with a user preference database to determine correspondences that result in unsorted output user recommendations for a user interface.

FIG. 2A and 2B comprise a flow chart of a video monitoring and rating method that determines when video is being played, and updates a user preference database based on a percentage of time the video is played, or an overriding direct user rating of the video.

FIG. 3A and 3B comprise a flow chart that allows video restriction based on the flow chart of FIG. 2A and 2B.

DETAILED DESCRIPTION OF THE INVENTION

Figure 1:
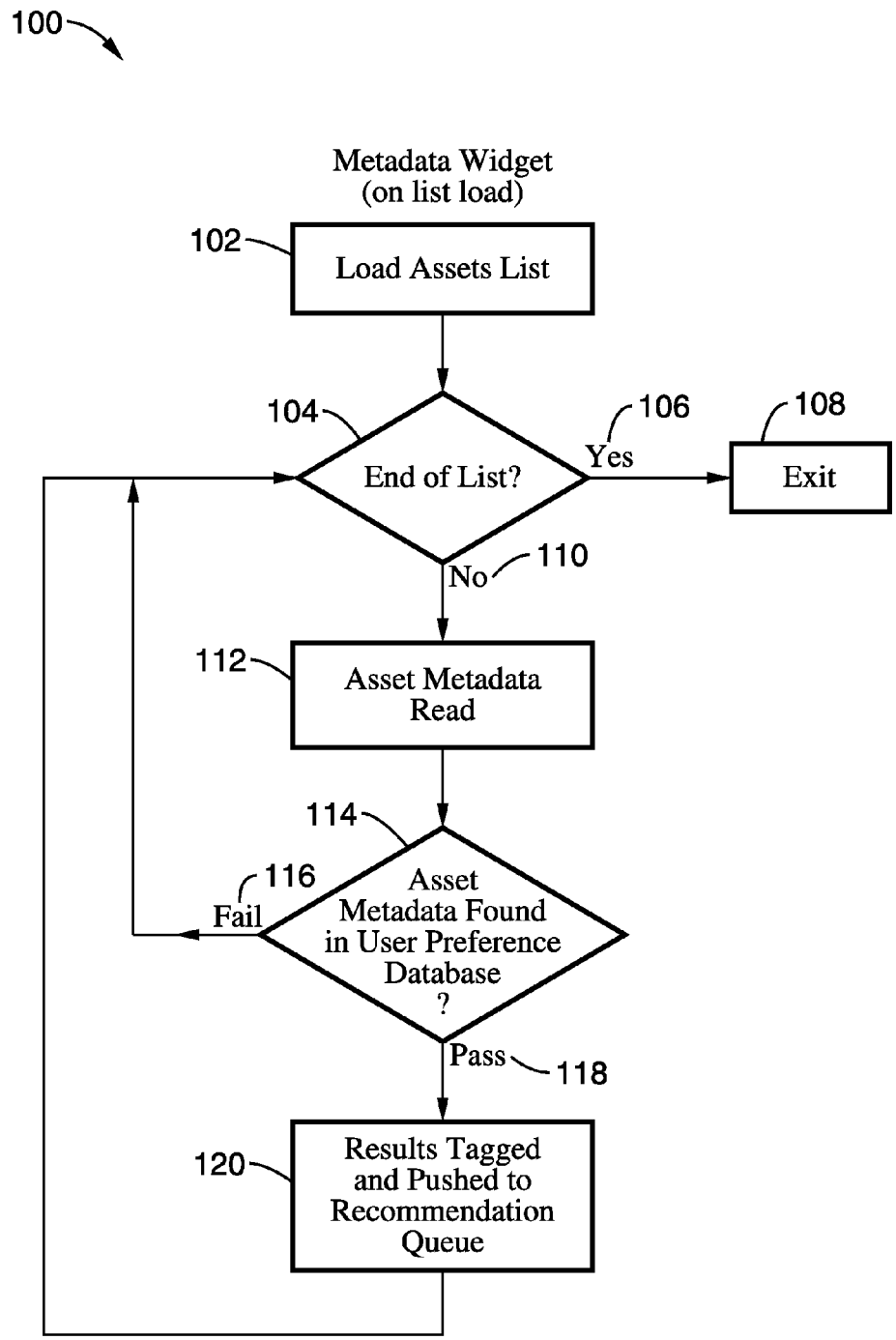

Referring more specifically to the drawings, for illustrative purposes aspects of the present invention are embodied in the methods and apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein. In particular, while the description below only discusses a single user, persons skilled in the art will have little difficulty adapting to multiple users.

Definitions

The following terms are used herein and are thus defined to assist in understanding the description of the invention(s). Those having skill in the art will understand that these terms are not immutably defined and that that the terms should be interpreted using not only the following definitions but variations thereof as appropriate within the context of the invention(s).

"Active Window" means the currently focused window in a current window manager or explorer or other display device. Different window managers indicate the currently-active window in different ways and allow the user to switch between windows in different ways. For example, clicking on a window in "back" of a foreground window will cause the selected background window to become active, and the previous active window to move back. The active window may be indicated by having a different colored title bar or other indicia. Clicking with a mouse is not the only way of selecting an active window, however: some window managers make the window under the mouse pointer active—simply moving the mouse is sufficient to switch windows; a click or double-click is not needed.

Window managers often provide a way to select the active window using a keyboard or other input device as an alternative to a mouse. One typical key combination is "Alt+Tab", used by Windows®; another is "Function +Tab", used by Macintosh®. Pressing the appropriate key combination typically cycles through all visible windows in some order, though other actions are possible.

Many, though not all, window managers provide a region of the screen containing some kind of visual control (often a button) for each window on the screen. Each button typically contains the title of the window and may also contain an icon. This area of the screen generally provides some kind of visual indication of which window is active—for example, the active window's button may appear "pushed in". It is also usually possible to switch the active window by clicking on the appropriate button. This area of the screen may be called the taskbar; the dock, or some other similar term.

It is important to note that the active window may not always lie in front of all other windows on the screen. The active window is simply the window to which keys typed on the keyboard are sent or to which other actions are directed; the active window may be visually obscured by other windows. This is especially true in window managers which do not require a click to change active windows.

Finally, with audiovisual display devices, there may be only one active window. Instructions entered into a remote control or other device may generate further windows, e.g. clicking the "MENU", "GUIDE", or similar button would then spawn a MENU window or a GUIDE window.

"Audio stream" means a collection of sound recordings played successively in time. In an analog example, a phonograph record is a physical embodiment of an audio stream, having one continuous groove physically representing amplitudes of the acoustic sound pressure of a recorded audio track. Similarly, a compact disc may contain digitized amplitude of a recorded sound, sampled at a given sampling frequency. This may be expanded to a digital versatile disc, or DVD, as a sound track for an associated video stream (defined below). Finally, analog or digital sound information may be associated in a common audiovisual stream with suitable analog or digital television broadcasts, resulting in black and white television, color television, and more recently high definition television.

"Video stream" means a collection of frames of images typically obtained with a video recorder sequentially played in time. The successive playing of the collection of frames of such images may also be referred to as a video image stream, or video stream. Such video stream may comprise a movie, a slide show, or other time-evolving photomontage. There may also be an audio stream associated with the video stream, e.g. the sound track of a movie.

"Metadata" means information about data. In the definition derivation "meta" means "about," so metadata means "about data," or, more specifically, "information about data." There is metadata that describes the fields and formats of databases and data warehouses. There is metadata that describes documents and document elements, such as Web pages, research papers, and so on. Herein, metadata will refer to information about an audio, video, or audiovisual stream, or information referenced by the audio, video, or audiovisual stream.

For instance, in the movie "Citizen Kane®", there appears near the end a scene with a now famous sled, with the name "Rosebud" painted on it. Metadata for the scene may comprise information that actor Orson Welles played the part of "Charles Foster Kane", and was also the director, as well as one of the screenplay writers along with Herman J. Mankiewicz. Metadata may also comprise the significance of the sled, symbolizing the last remaining shred of a mother's love. Such metadata, in a very full example may include a director's analysis of the psychological significance of the burning sled as the final loss of a mother's love, or the last memory of a mother's love.

"Metadata stream" means a flow of metadata, including without limitation metadata is associated with either an audio stream, a video stream, or both such streams.

"Widget" means a component of a graphical user interface (GUI) with which a user interacts. The GUI is generally supported by underlying processing specific to that particular GUI "Wandering Widget Object" means a widget that disappears and appears at various locations on the display when evoked or disposed.

"Still image" means a single image that is not normally part of a video image. Still image may also be referred to as a still picture.

"Computer" means any device capable of performing the steps, methods, or producing signals as described herein, including but not limited to: a microprocessor, a microcontroller, a video processor, a digital state machine, a field programmable gate array (FPGA), a digital signal processor, a collocated integrated memory system with microprocessor and analog or digital output device, a distributed memory system with microprocessor and an analog or digital output device connected by digital or analog signal protocols.

"Computer readable medium" means any source of organized information that may be processed by a computer to perform the steps described herein to result in, store, perform logical operations upon, or transmit, a flow or a signal flow, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FPGAs), flash random access memory (flash RAM); and information transmitted by electromagnetic or optical methods including, but not limited to, wireless transmission, copper wires, and optical fibers.

"User Preference Database" means a data structure (database) that maintains choices that a user has made that relate to the user's interests, including without limitation examples such as Star Wars® , action, romance, George Clooney, George Orwell, 1941, William Randolph Hearst, James Bond®, 007®, drama, horror, PG17, and Sean Connery. Interests may contain both things a person rates as highly likes, partially likes, or dislikes. The database may contain a collection of organized preferences for more than one user or category of user. Categories of user preferences may comprise without limitation: children, teens, "guy" movies, "chick flicks", etc. Conceivably, preconstructed databases of such broad categories may be downloaded to initiate a user preference database. It is envisioned that the user preference database would have linkages between entries and their ratings, thus, when a comparison is made with an entry, if a match is found, then the rating given to the entry may be retrieved. Similarly, all entries with a given rating may be found.

A very simple user preference database would simply be lists associated with each rating attribute, such as a 0-star, 3-star, or 5-star list. An element found in one of the lists would have the rating attribute of the list itself.

"Database" means a structured collection of data which is structured according to a database model. Without limitation, the most commonly used structure is a relational model. Ultimately, a database allows a response to an input query to be generated with meaningful data. For example, a user preference database may comprise vectors of 0-star, 3-star, and 5-star video or audio sources, respectively corresponding to disliked, partially liked, and highly liked entertainment sources relative to a particular user. Each entertainment source may additionally have other linkages to actors, actresses, directors, set locations, etc. resulting from a full data mining of user preferences.

When referring to a 0-star entry, what one means is that the entry has a linkage to a rating that has a 0-star value, and is disliked by the user. Thus, when an element of metadata is added to the user preference database, both the element, and suitable linkages to the rating value are added. These latter linkages are traditionally supplied by background database maintenance mechanisms (SQL and the like), or may be directly coded for compactness.

"TV" means television, or remote viewing. A typical TV may be a standalone receiver that receives an analog or digital signal, and processes it for viewing or listening by a user. In an alternate definition, it is a set of hardware capable of displaying the video, audio, or both signals to a viewer. Such hardware may be limited only to the viewing, hearing, or both of video signals, or may be part of a computer system capable of other uses beyond that of television reception and displaying of video, audio, or both. The television may also comprise a video monitor, an audio monitor, and a means for processing an input video stream. Shortly, all television in the United States will be broadcast in High Definition TV (HDTV). Further, such programming may be broadcast, transferred by digital or analog cable signal, or repackaged into TCPIP packets for transmission over the internet.

1.0 Introduction

One aspect of this invention allows for the updating of a user interface reflecting the past experiences of a user. For instance, if a user has previously determined that the jazz trumpeter Wynton Marsalis is an excellent performer, then a guide to upcoming programming including Wynton Marsalis in the title or metadata would be accordingly indicated by a wandering widget object. The indication by the wandering widget object might be visual within a video programming guide, or may be auditory in an audio guide. In still another mode, the wandering object may be a video widget reflecting information in the audio guide, or an audio widget reflecting video information.

As a particular user interacts with this invention, preferences may be generated either by direct rating by the particular user, or by determining the amount of time a particular video is played in proportion to its entire play length.

Video is typically used as an example of the source material a user is sensing. However, strictly audio material may be used instead, and a video interface to audio material may also be used. It is to be understood that video is really comprised typically of both a video signal stream and one or more audio streams, and potentially one or more metadata streams. The term audiovisual comprises all audio, video or audio and video sources, along with all associated metadata.

1.1 Wandering Object

In one aspect of the invention, a wandering object understands the user's favorites and compares it with the metadata of the video or audio available content, and provides recommendations after analyzing the results of comparisons with a user preference database. If there is a positive result, the wandering object wanders over to the video (or audio) clip or channel and offers suggestions either verbally through the audio output or visually through a speech bubble so as to indicate the positive result to the user.

The wandering object method makes content recommendations interesting and interactive for the user, as opposed to reading textboxes that typically appear on the viewing screen.

This wandering widget object feature can be implemented as a special wandering widget that has access to appropriate data on a TV and may reside on the overlay layer of a dual layer widget platform.

1.1 Wandering Object—Example

As one example, perhaps a particular user has abiding passion to view and listen to anything relating to Kelly Clarkson, the first American Idol® finalist. Thus, when viewing a programming schedule guide of upcoming events, a user may scroll through many pages of different offerings, in some cases as many as a thousand or more channels for perhaps a 14 day or longer span. Each of these offerings would be termed an asset, and metadata relating to the asset would be downloaded and compared with the user preference database.

If metadata in a programming asset is found with the entry "Kelly Clarkson", a widget would fade into being, with a text bubble, color change, or other indicator showing that "Kelly Clarkson" was to be shown on the particular program, and describe the programming choices available. Alternatively, only some sort of interest might be displayed, without any indication of the search term "Kelly Clarkson".

After each recommendation entry is indicated, a variable time is spent waiting for a user input. If the user makes no input, then the next recommendation is in turn indicated. At the end of the recommendation list, the wandering object may either fade away, or continue looping.

The user may control how much of the recommended programming is to be displayed; only the strong recommendation, both strong and weak, or all, including those that are negative recommendations. Additionally, the user may indicate only those recommendations that have been personally viewed and rated.

In another alternative embodiment, the user may have ceased scrolling in a long list of program offerings. At that point, the asset metadata for programs further in the future might be downloaded, and the next available show with "Kelly Clarkson" would then be indicated on the screen by moving the guide to the time and channel where "Kelly Clarkson" was appearing.

Similarly, for audio programming, metadata may be downloaded from the channel that includes a song including "Kelly Clarkson" scheduled for a specific date and time. The guide, now indicating audio programming, would be moved, and a widget faded in to indicate that "Kelly Clarkson" would be performing. With either the audio or video example, the widget would fade in, center the schedule, and allow for easy marking for recording or viewing of the event.

The wandering widget object concept makes audiovisual interactions more interesting and interactive for the user, as opposed to simply reading textboxes that appear on the screen in a static fashion.

The wandering widget object can be implemented as a special widget that has access to appropriate data on the audiovisual device and may reside on an overlay of a dual layer widget platform.

The wandering widget object invention may, without exclusion, be targeted to internet videos or other premium content as a form of value-added content.

1.2 Implementation Aspects

In one aspect of the invention, the wandering widget object may be turned on or off by the user. Any administrative actions (e.g. enabling or disabling of the wandering widget, setting of restriction levels, etc.) could be configured to require a pass word entry.

The wandering widget object may be able to be used in conjunction with video programming guides, cable TV audiovisual channels, input videos from peripherals such as CD, DVD and Blu-ray players or other video sources found on the TV, such as programming resident on external hard disc drives (HDDs), HDD-based devices (e.g. TIVO®), and other streaming devices, etc.

The method of comparing an asset's metadata with the user preference database is done by a recommendation search engine, which may have advanced data mining algorithms to delve into the connections between the metadata (which can be from within the movie content itself) of the movies that users watch, and the user preference database, to form a basis for future recommendations. Other simpler, but likely not as accurate algorithms, could be based only on user favorites as established by their viewing habits

1.3 Operational Sequence for Internet TV

The following steps would likely occur to implement one set of aspects of this invention, specifically with regards to an Internet TV (IPTV), Sony's "Best Resolution Audio Visual Integrated Architecture" (BRAVIA) Internet Link (BIVL) or Apple TV, etc.

Initially, the user selects a service that provides programming content from the internet. A list of programming assets is downloaded from the corresponding service and a first portion of the list is displayed as an asset program guide; this would be the assets list.

The recommendation engine then processes the assets list and determines by comparison with the user preference database a list of successful (highly or partially liked) results and a list of failed results (definitely disliked). With each result found, the rating attribute of the element is found and used.

The animated wandering widget object then sequentially proceeds to each of the recommended assets one after the other, and sends a message to the user recommending the listing, whereupon the user may select (on a remote or other signaling device) the asset for accessing or recording. At the end of the queued list of recommended assets, the screen reverts to the first page of the displayed list of programming assets.

With regards to the definitely disliked results, the wandering widget object may either point these out to the user, or may remove the disliked asset from the program list, or may move such entries to the last few pages of the asset programming guide. Similarly with highly liked programs, the wandering widget object may also reposition the highly recommended video listings to the first page.

Channel Recommendation

Another type of recommendation the wandering widget object may present is current programming channel recommendation. For example, if one or more favorite TV shows are currently being transmitted, and the wandering widget object has determined that the user likes or may like the program, then the wandering widget object may recommend it to the user. If the user agrees with the wandering widget object recommendation, then the user may select the program for viewing or recording as desired. Such a recommendation may be made on a one-by-one basis, visually, audibly, or both.

When the wandering widget object is otherwise idle, the wandering widget object may perform idle activities, such as wandering around the active screen without undue obstruction of the active screen, hiding on the side with only a small visible portion, or fading to obscurity.

The wandering widget object may be turned on and off upon user's choice.

Additionally, if the wandering widget object is covering an asset when the navigation focus is in its proximity, the wandering widget object will wander away from the navigation focus.

Wandering Widget Communication with other Widgets or Objects

The wandering widget object has access to the asset recommendation results, and also may have communication with other widgets and information known by these other widgets.

The wandering widget object will generally reside on a topmost (or overlay) layer of a dual layer screen, with other background viewing concurrently taking place. Such background viewing may be the current audiovisual program playing. Thus, if the user chooses to hide the wandering widget, the user may do so at the click of a button, to better view the background program. This topmost overlay layer may also contain other widgets such as a clock, weather forecasts, stock reports, etc. By hiding the topmost display layer, all the other displayed widgets may simultaneously be hidden as well. Alternatively, the wandering widget object making recommendations, or other individual widgets, may separately be hidden by user command.

Alternatively, the wandering widget object may reside on a separate layer reserved specifically for it and other widgets residing on the layer. Regardless of the layer of residence, the wandering widget object must also know the screen coordinates of the recommended asset so that it may be able to move to the coordinates of the program to be recommended, and thereby provide the interactive recommendation.

When a user's selection tool moves to the proximity of the wandering widget object, the wandering widget object may move away so as not to block the view of the windows displayed behind the widget.

As an asset's metadata is processed, each element that corresponds to the user preference database may be pushed onto a recommendation queue for that particular rating attribute, or may be pushed with the rating attribute onto a common recommendation queue.

2.0 User Preference Method 2.1 Form Recommendations From an Input Assets List

Refer now to FIG. 1, which details how the asset list is loaded 100. An assets list is a list of available programming information that could be accessed by the user. This may be a list of recordings previously made, available web-based programming, and a guide of current broadcast or cable programming currently playing or playing in the future.

The assets list, regardless of its contents or source, must be made available to be read, so is loaded 102.

The assets list is read 104 until an end of the list is reached 106, when this process exits 108.

When the assets list is not at its end 110, the next asset on the list is read, and metadata associated with the current item is read 112. This metadata associated with the asset would then be termed the asset metadata.

The asset metadata is then compared with the ranking found in the user preference database 114 (otherwise referred to as the user preferences in short). If, among all the elements of the asset metadata, there is no corresponding element in the user preference database, then the comparison is said to have Failed 116. Otherwise, the comparison is said to have Passed 118.

Where comparisons have Passed 118, the resultant metadata and its associated n-database ranking are pushed into a Recommendation Queue 120.

Further processing of the Recommendation Queue may use colors associated with each level of the 0-, 3-, and 5-star attribute rating levels, such as red, yellow, and green, respectively for content that is disliked, partially liked, and highly liked. Thus, if an asset list is displayed to the user, highlights such as the red, yellow, and green previously discussed may indicate programming that is disliked, somewhat liked, and highly liked. In this manner, users may quickly navigate programming that would be of interest to them based on their prior experiences and ratings.

2.2 User Preference Acquisition

Figure 2A:
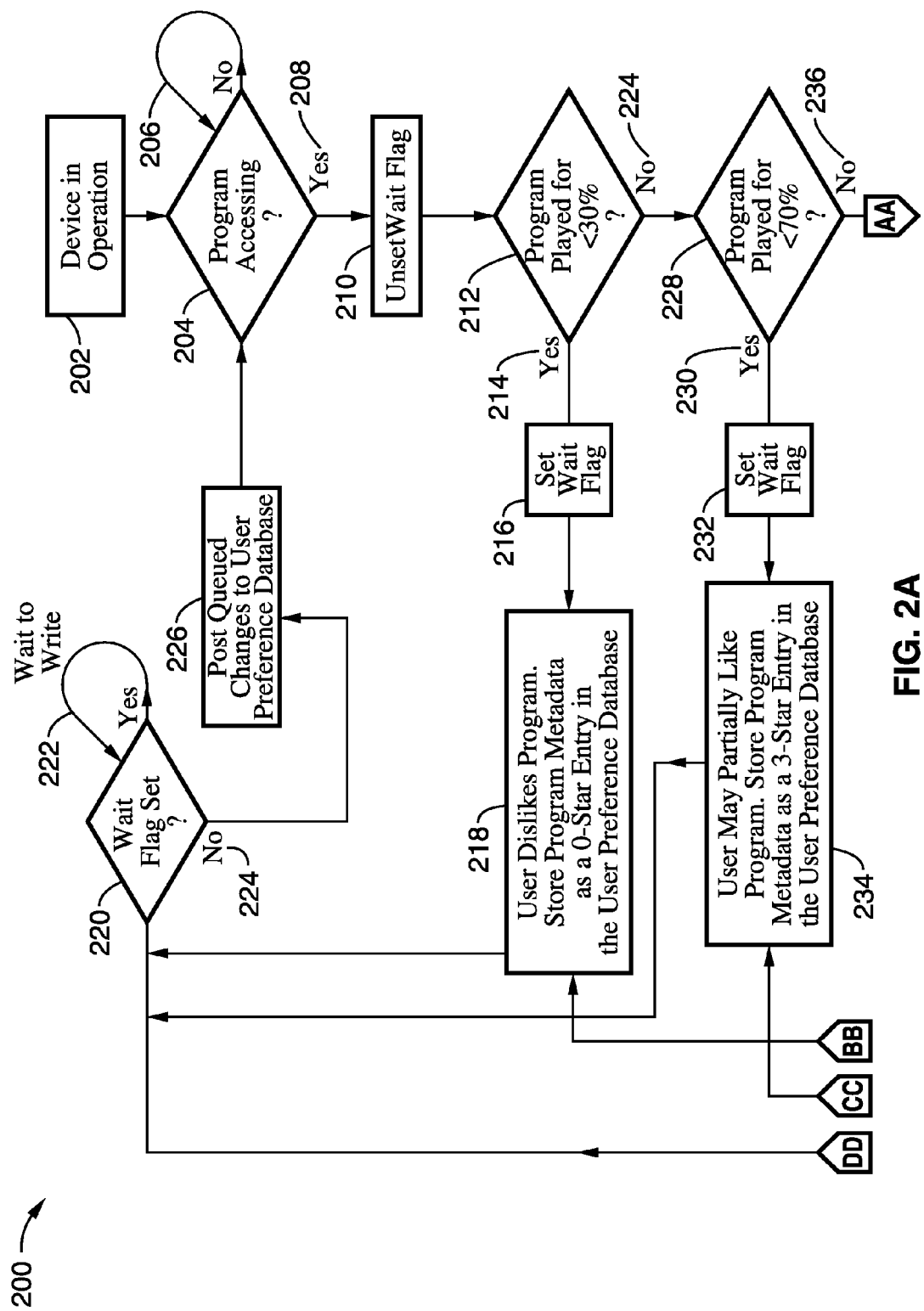
Figure 2B:
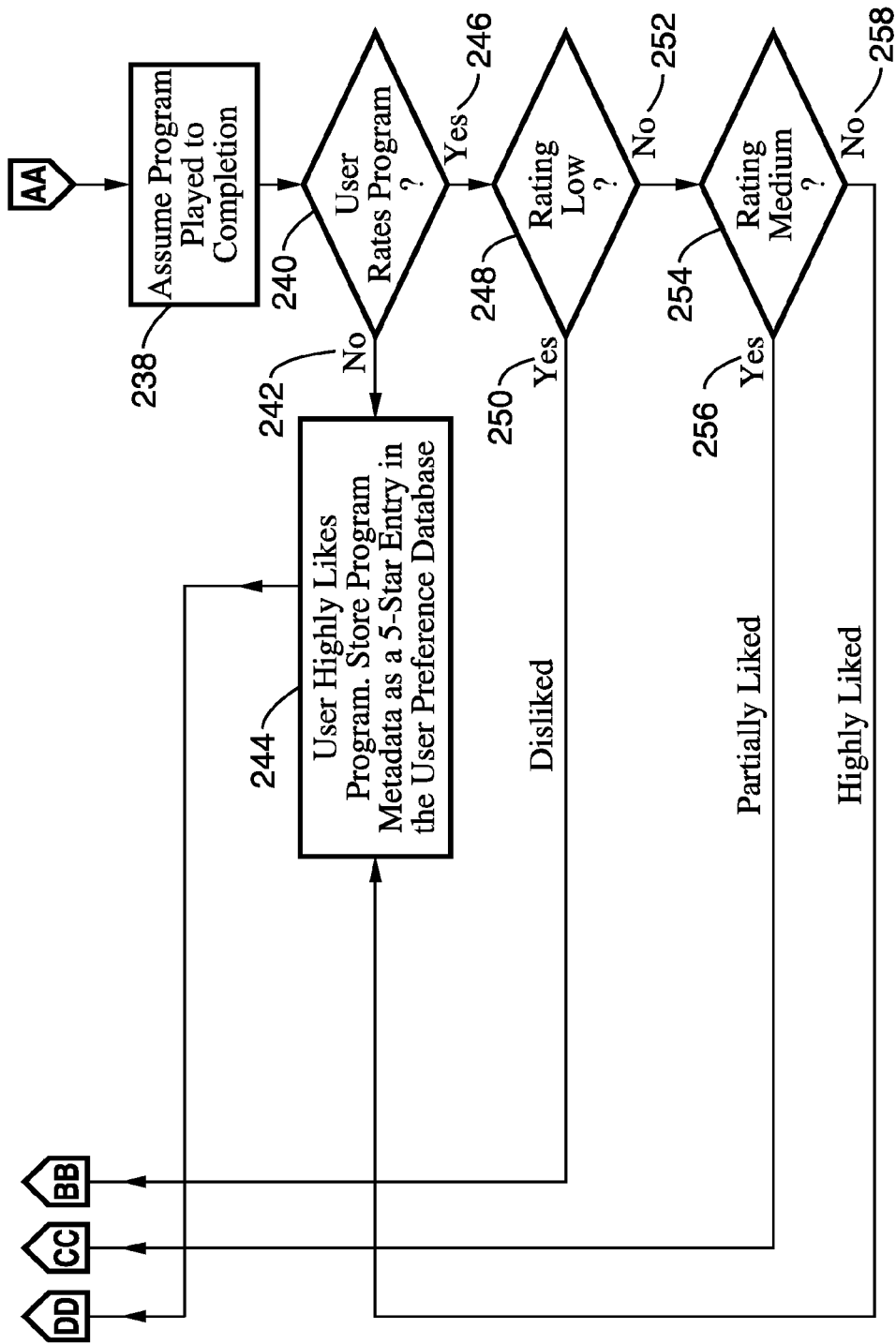

Refer now to FIGS. 2A and 2B, which together are a flow chart 200 showing a user preference acquisition method for an operating device that has already been initialized 100, and is currently running. Here, the device is in operation 202, and has already been initialized. Nearly all of the time spent in this method is a loop that determines whether a video is being played 204. If it is not, then the process waits 206 until video is being played 208. While this technique is shown as a software or hardware loop 208, it may be interrupt driven from an external event clock, or other interrupt source, such as receipt of a user signal.

The external event clock (not shown here, since this technique has been widely used in the past) may simply be a periodic sample clock, or may be timed by some user preference to intervals of seconds, minutes, or longer. When other activities, such as channel flipping occur, the event may be triggered to determine whether a program is being played 204.

In the event that a program is being played 204, the Yes branch 208 is taken, and the Wait Flag is unset 210. This Wait Flag will be used to determine whether the user has been interrupted from accessing the program, which will be described in further detail below. The next test is whether the program has been played for a relatively short time, here for less than 30%. This level of short time may be either fixed, or user configurable to be a percentage or an absolute amount, e.g. 25% or 2 minutes.

The determination of the percentage of time played may be based on the expected running time of a particular program, e.g. 2 hours, 3 hours, etc. including commercials. The determination of when a commercial is being played may be found from either changes in sound levels, or changes in luminance or chrominance data, or by data provided by the programming stream in the associated metadata stream as to when there is programming and not commercial present.

If the program was played for less than 30% 212, then the Yes branch 214 is taken. The Yes branch 214 assumes that the user may not like the program 214. At this point, the Wait Flag is set 216. The Wait Flag acts to delay application of enqueued changes to the User Preference Database as will be described further below.

After setting the Wait Flag 216, it is assumed that the user dislikes the currently accessed program, and program metadata is written into a queue for storage into the User Preference Database as a 0-star entry 218.

Next, the Wait Flag is tested to see if it is set 220 for all program ratings as described later. If the Wait Flag is set 220, then the Yes exit is taken 222, and the program loops 222 for a variable amount of time prior to exit. If the device is in the meantime powered down, then any such queued changes are not posted, and will never be posted to the User Preference Database.

If the device is not powered down, then the Wait Flag Set 220 loop continued in the Yes loop 222 until a prescribed time or action occurs. For instance, if the programming channel is changed, the loop 222 is exited with the Wait Flag unset 224, next proceeding to post 226 any pending changes to the User Preference Database.

If, during the looping of the set Wait Flag 222, a timeout occurs prior to any channel change or the device powering down, it is assumed that the user has stopped accessing the device, and any queued changes may be selected to not be implemented in the User Preference Database. Thus, it may be inferred that the user was otherwise interrupted from accessing the program due to some other external event.

After posting of any pending queued changes to the User Preference database 226, we return again to determine if a Program is Accessing 204.

For simplicity, the Wait Flag set loop 222 is simply indicated as a loop. However, alternative testing and delayed writing mechanisms may be used by using various system clocks and timers, or interrupt processing. These methods implement the same general actions shown in the flowchart of FIG. 2A and FIG. 2B, but with somewhat more complexity.

Returning to the 218 block for 0-star entry for a more detailed description, the program metadata is marked for entry with a 0-star rating attribute for the User Preference Database. Information contained in the metadata, such as descriptive keywords, genre, cast, etc. may thereby be queued for linkage with the 0-star rating attribute in the user preference database. Identical metadata elements placed with the 0-star rating attribute are queued for removal from the 3-star and 5-star rating attributes. In this manner, conflicting entries may be removed. If each element in the User Preference Database is only linked to a single rating attribute, where an element is already present in the user preference database, just its rating attribute may need updating by a queued instruction for the User Preference Database.

Alternatively, when a specific preference is determined to have a 0-star rating preference in the User Preference Database, for a given entry, for instance "Barney®", the "Barney®" character count may be queued for incrementing analogous to a "hit" on a web page. Thereby, perhaps there are 37 0-star entries, 5 3-star entries, and 1 5-star entry in the User Preference Database. This would indicate that the user has frequently disliked metadata associated with the "Barney®" character as a member of the cast. Young children might have such ratings inverted, with 1 0-star, 5 3-star, and 37 5-star entries.

Regardless of which User Preference Database update method is used (which also might be user configurable) the above methods for delayed queued posting of updates to the User Preference Database may similarly be used for the 3-star and 5-star entries.

The User Preference Database here contains entries from 0 to 5 stars, where 5 is most liked, and 0 is least liked. Although not detailed here, the 1-star and 4-star ratings may be further used to provide finer granularity to user preferences in a straightforward fashion.

After the 0-star entry is queued for the update, the method posts the queued changes to the User Preference Database 226, and then returns to determining whether a program is being accessed 204.

Continuing on, if the accessed program has been not played for more than 30% 212, then the No branch 224 is taken.

Next, it is determined whether the program is partially liked 228, by determining whether the program has been played for less than 70% (or some user configurable percentage). If so, the Yes branch 230 is taken, the Wait Flag is set 232 as previously described, and it is determined that the user partially likes the program 234. The program metadata is then queued for storage as a 3-star entry (with the other entries accordingly updated) in the User Preference Database, and the process loops back to determining if the Wait Flag has been set 220.

If the program has not been played for less than 70%, then it has been played between 70-100% by the law of trichotomy, and the No branch 236 is taken. In this case, it is assumed that the program has been played to completion 238.

At this point, it is determined whether the user would like to rate the program 240. If the user does not want to rate the program, then the No branch 242 is taken and it is determined that the user likes the program 244 by virtue of having accessed the program greater than 70%, using the assumption that the program was played to completion 238. In this case, the program metadata is queued for storage as a 5-star entry (with the other entries accordingly updated) 244, and the process continues back to determining whether the Wait Flag is set 220 as previously described. At this point, the Wait Flag has not been set, although the algorithm could be changed so as to set the Wait Flag as well.

If the user does wish to give a rating 240, then the Yes branch 246 is taken for ratings determination. First, it is determined whether the user wishes a low rating 248.

If the user wishes to give a low rating to the program 248, then the Yes branch 250 is taken, and the program metadata is queued for storage under a 0-star entry 218 (with the other entries accordingly updated) in the User Preference Database. Processing continues with determining whether the Wait Flag is set 220. In this instance, the Wait Flag is not set, and the queued changes are posted 226 to the User Preference Database.

If the user does not wish to give a low rating to the program 248, then the No branch 252 is taken, and it is determined whether the user wishes a medium rating 254. If a medium rating 254 is desired, then the Yes branch 256 is taken, and the program metadata is queued for storage under a 3-star entry 234 (with the other entries accordingly updated) in the User Preference Database. Processing continues with determining whether the Wait Flag is set 220. Here, the Wait Flag continues to be unset from step 210, so queued changes are posted 226 to the User Preference Database. Processing continues with determining if there is a program being accessed 204.

In this example, it was shown that only 0, 3, and 5 stars were ascribed as attributes to a certain program. For further discrimination, the 1, 2, and 4 star rating attributes could additionally be used. Furthermore, a simple slider could be used as input to grant the user preference in a rating attribute, reflecting in the storage of the program metadata under the appropriate n-star database.

2.3 User Preference Restrictions

Previously, only 0, 3, and 5 stars were ascribed as attributes to a certain program, with provisions for 1, 2, and 4 stars also being possible. However, there may be additional categories of program that may be suitable only for classes or certain individuals, such as children, teens, or even specific children (Suzie may be more emotional than her twin Johnny at age 12, for instance). Thus, additional ratings categories may be used in addition to the 0, 3, and 5-star method.

Current parental control ratings limitations are transmitted by various service providers for video programming. In the United States, the V-Chip is used for parental control depending on the ratings given by the organization releasing the programming material. However, this limits user's flexibility because either the programs of a specific category are totally removed, or totally available for all users. The user does not have the choice of having the videos available for some users but not others, unless the user specifically set the option on the home menu that enables or disables parental control.

Here, one or more additional categories may be added to the 0, 3, 5-star categories of the User Preference Database. Such categories may have restrictions as to their accessing by certain individuals or classes of individuals. These restriction categories allow users to exercise detailed parental control through the use of a widget that blocks out videos with ratings that are unsuitable for young kids, specific children, while making it available to users who are of age or maturity.

If the user wishes to watch the program (either video or audio), a password code will need to be entered if the user wishes to view the content. This allows the video to be always available for viewing yet restricts child and other restricted personnel access at the same time.

Figure 3A:
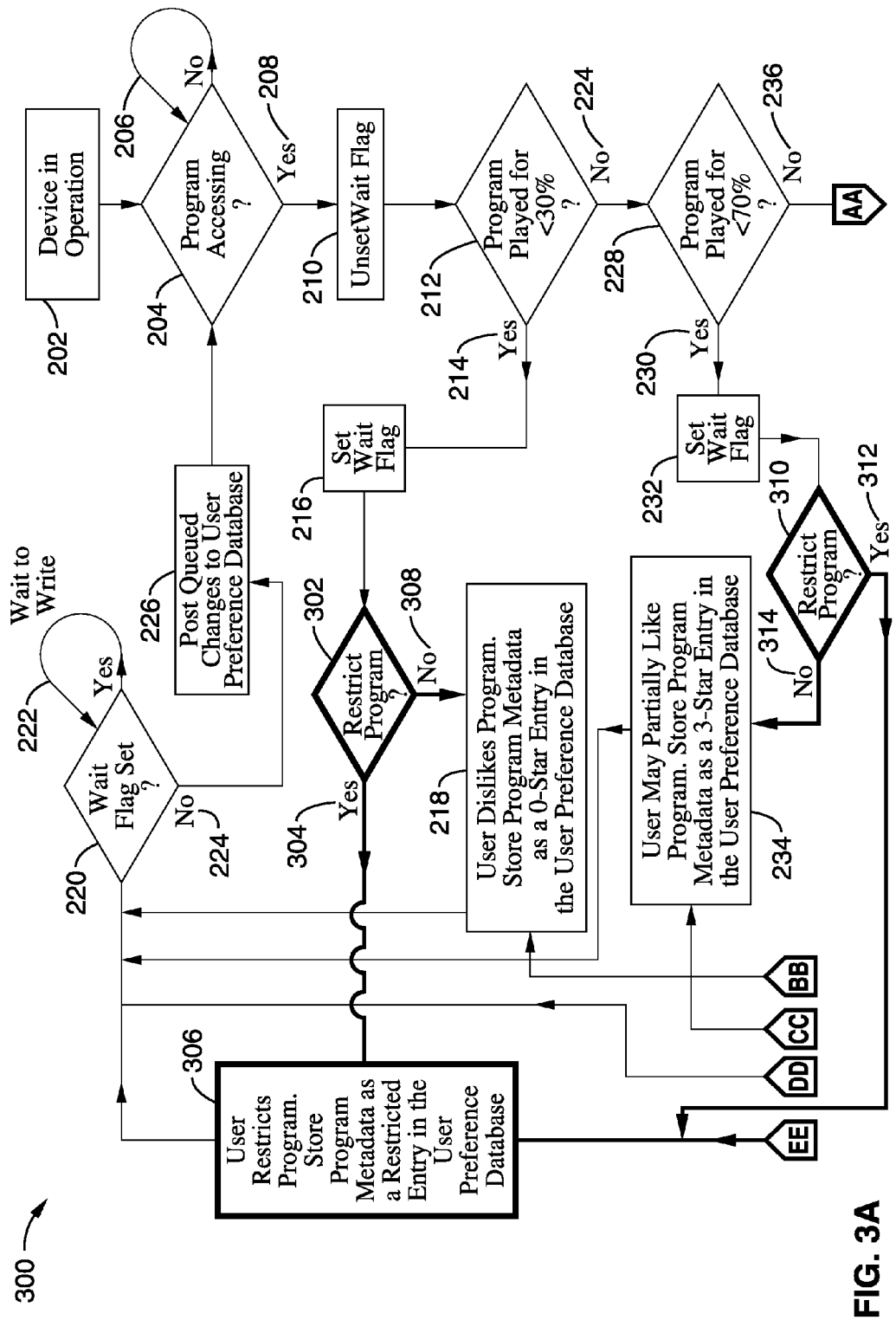
Figure 3B:
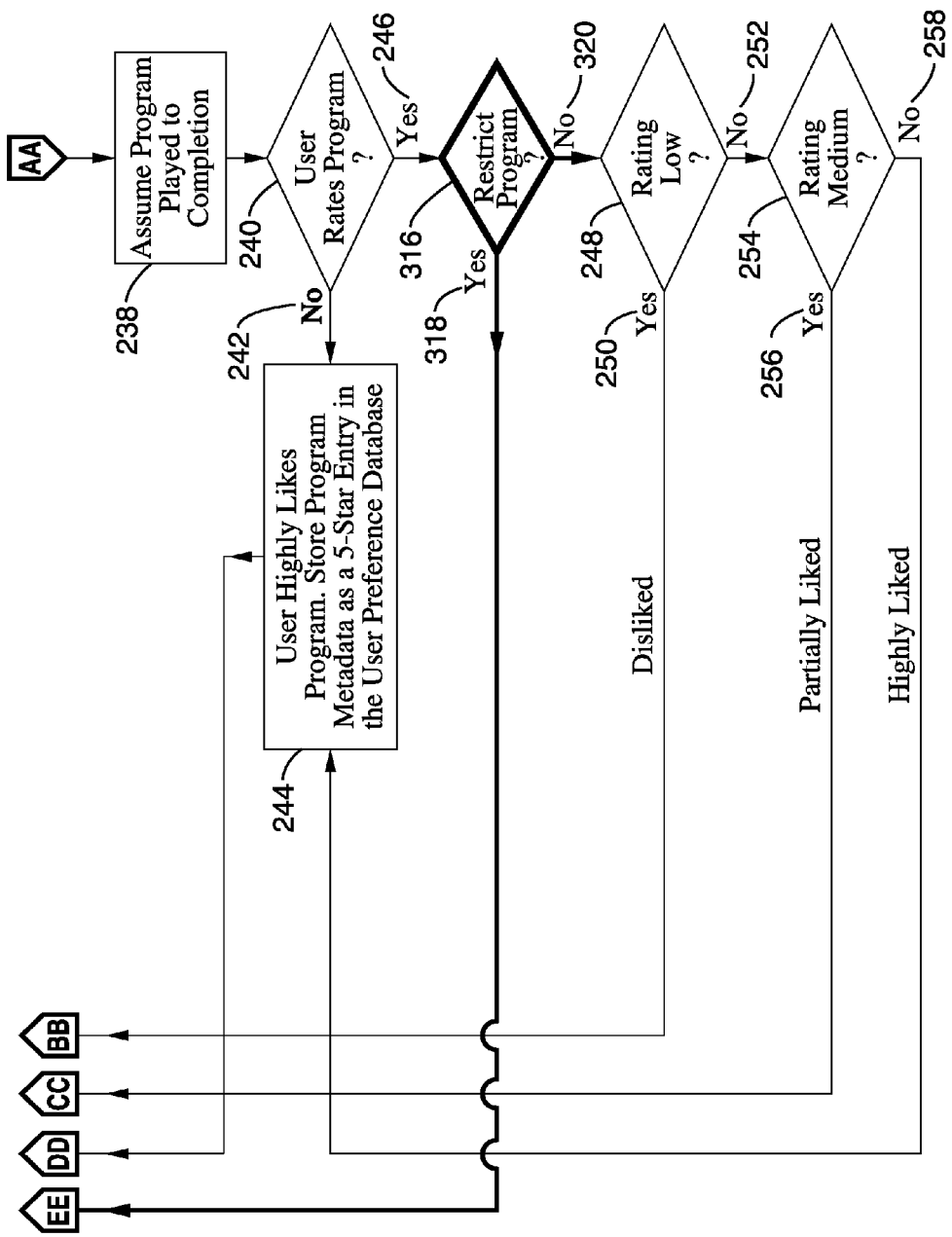

Refer now to FIGS. 3A and 3B, which are a flow chart of one embodiment of a user preference restriction. Here, a new category to the 0, 3, 5-star categories of the User Preference Database has been added. This category is called the "Restricted" category. FIGS. 3A and 3B take the flow chart previously described in FIGS. 2A and 2B, and add one embodiment of a video restriction method. As previous FIGS. 2A and 2B were described in detail, the unchanged portions of FIGS. 2A and 2B remain as previously labeled.

After the Set Wait Flag 216 is acted upon after the program has been accessed for less than 30%, a test is made to see whether the user wishes to Restrict the Program 302. If Yes, then the 304 branch is followed to block 306, where the User restricts the program and any program metadata is enqueued for storage as a Restricted Entry in the User Preference Database. After block 306, the program continues to the checking of the Wait Flag 220, and continues as previously described. If the No branch 308 is taken from the Restrict Program test 302, then the program continues unchanged as previously described to block 218.

Similarly, after the Set Wait Flag 232 is acted upon after the program has been accessed for less than 70%, a test is made to see whether the user wishes to Restrict the Program 310. If Yes, then the 312 branch is followed to block 306, where the user restricts the program and any program metadata is enqueued for storage as a Restricted Entry in the User Preference Database. After block 306, the program continues to the checking of the Wait Flag 220, and continues as previously described. If the No branch 314 is taken from the Restrict Program test 310, then the program continues unchanged as previously described to block 234.

Finally, after the user has assumedly played the program to completion, the user is asked if the program should be rated 240. If the program should be rated 246, then a test is made to see whether the user wishes to Restrict the Program 316. If Yes, then the 318 branch is followed to block 306, where the user restricts the program and any program metadata is enqueued for storage as a Restricted Entry in the User Preference Database. After block 306, the program continues to the checking of the Wait Flag 220, and continues as previously described. If the No branch 320 is taken from the Restrict Program test 316, then the program continues unchanged as previously described to block 248.

In another embodiment, the user may choose to associate the defined V-chip (or any other existing parental control solution) rating levels to the local user-defined rating levels. If this were so, then when the test of whether or not to restrict the program 316 is made, there is already an expected value available from the V-chip, upon which the user could choose to agree or disagree. In this case, the V-chip rating would act as a default selection value. If the user does not agree with the V-chip rating, then the user would instead select to independently rate the video. This process would reduce the user interaction time required, if the user agrees with the recommended rating, and would also give the user a basis upon which to initially judge the rating of the program.

In another embodiment, metadata gathered from a first program could be applied as a test against the metadata of other programs, so that a user-defined rating for a first program could be extended or recommended to other programs. If the metadata of two such programs had a significant degree of correlation (perhaps greater than 50% with nouns and verbs), then it would be assumed that they would be of similar nature, which could possibly invoke the same user-defined rating of the first program that might be in disagreement with the V-chip's ratings. The user would then need to explicitly allow the recommendation of the first program to be applied on another program.

2.4 Metadata Widget

Figure 4:
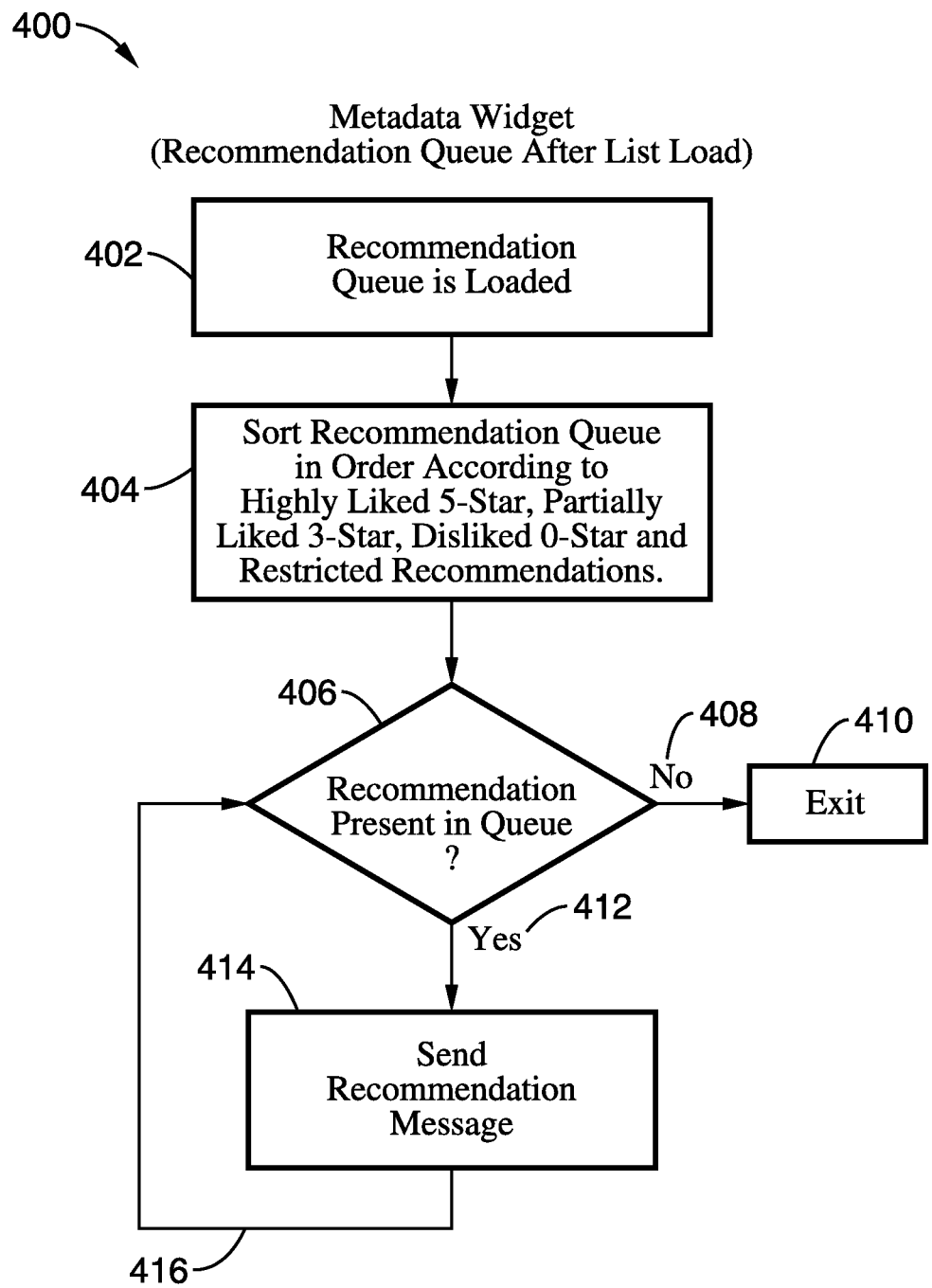
FIG. 4 is a flow chart of one method that sorts for the user interface the unsorted output user recommendations generated in FIG. 1 to create an output comprising matches with the user's preference database in the user interface.

Refer now to FIG. 4, which is a flow chart of a metadata widget after a list of available programs has been built. Initially, there are no recommendations, so the Recommendation queue is empty. However, after some time of processing available, there may be a non-empty Recommendation queue.

Initially, the Recommendation queue is loaded 402. Then, the Recommendation queue is sorted 404 into the Restricted, 0, 3, and 5-star categories.

If 406 there is no recommendation present in the Recommendation queue for a program in the list of available programs, then the No branch 408 is taken, and the procedure exits 410.

If 406 there is a recommendation present in the Recommendation queue for a program in the list of available programs then the Yes branch is taken 412 and a Recommendation Message is sent 414. The process then continues looping 416 until there are no more recommendations to process.

At this point, there may be Recommendation messages that may be processed by a display module that, for instance, would color code program scheduling guides with the current user preferences. Additionally, restricted programs could also be indicated.

3.0 Restriction Overview

Restriction, either of video or audio programming, is an important option for parental control over programming content available to minors. Typically, the only video restriction possible is through use of the V-Chip. However, programs may not be rated, thus resulting in no V-Chip rating. Audio programming will have no V-Chip rating whatsoever, as it is not a video source.

Further, parents may disagree with the rating standards as applied to their particular children. In this case, additional metadata may be placed into the User Preference Database within a Restriction category, and indeed, a variety of such Restriction categories may be used, as applicable to more than one child.

In one embodiment, the restriction method will be utilized on an overlay of a dual widget platform. These dual widgets would be the Restriction Widget Blocking Procedure (the Blocking Widget), and the Restriction Widget Release Widget (Release Widget).

Upon device startup, restriction is automatically enabled, unless specifically otherwise set by the user in a device option menu.

Upon selection of a restricted program, a password code prompt would appear to prompt the user for the password. If successful, the programming restriction will be disabled until it is once again enabled, or when the AV device reboots. If the password response is unsuccessful, the program may not be accessed.

To manipulate the programming restriction settings, the user may view the settings on an overlay level of the widget platform and configure the settings for the Restriction Widget as required. With these configurations, the user may choose to restrict access to audio content, video content, video guides, or external source content with any desired rating.

With this overview in mind, now the detailed process widgets may be described.

3.1 Accessing Restricted Programming

Figure 5:
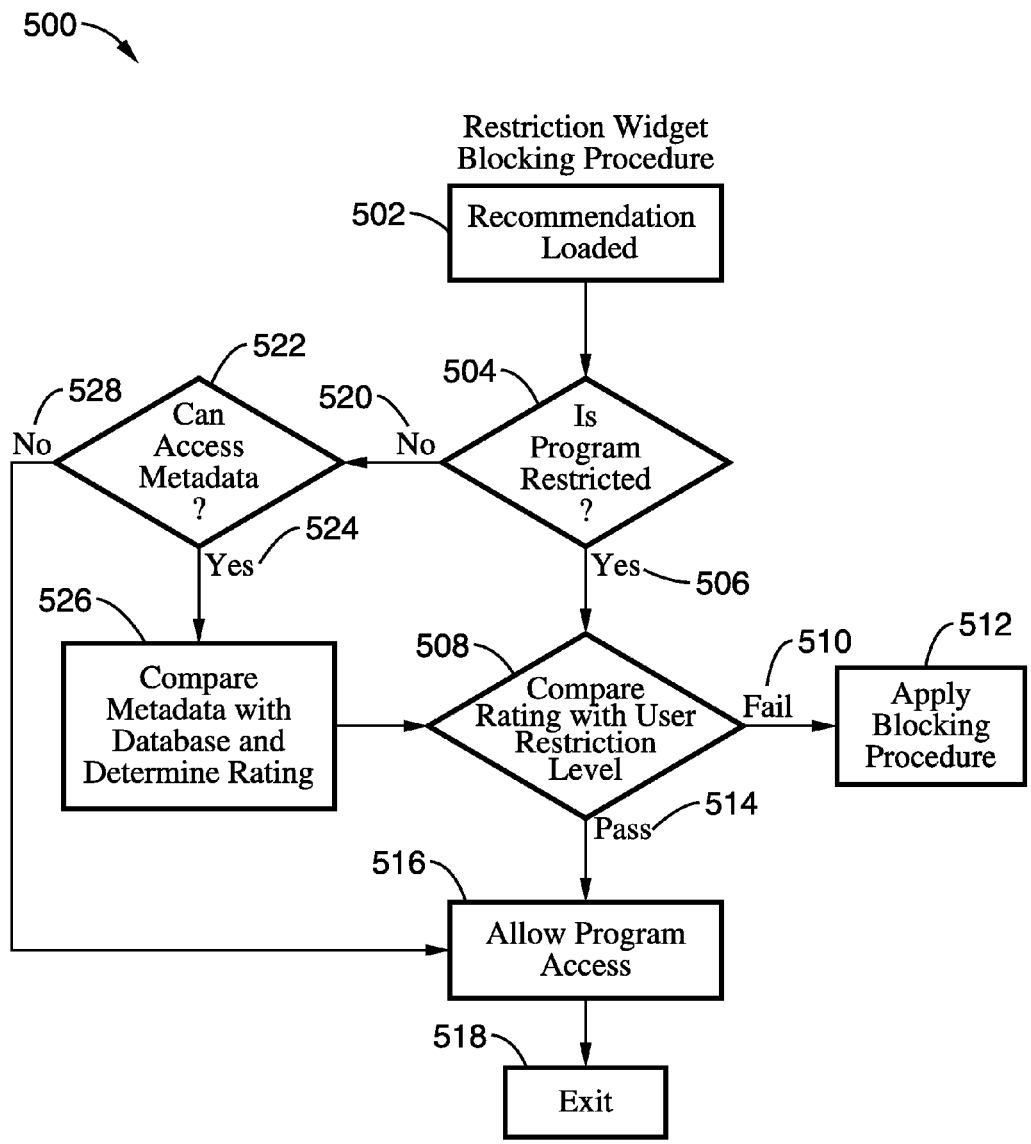
FIG. 5 is a flow chart of a Restriction Widget Blocking Procedure that blocks program if it is restricted and the User's restriction is insufficient for accessing.

Refer now to FIG. 5, which details the procedure 500 used to access restricted programming. Here, a Recommendation is loaded 502 for a particular program that is sought to be accessed. If the program is Restricted 504, then the Yes branch is taken 506, and the current User Rating is compared 508 with the Restriction Level. This assumes that both the User Rating, and Restriction Levels may take on one or more values, similar to the PG-13, R, etc. previously described.

If the User Level is less than the Restriction Level 508, then the Fail 510 branch is taken, and access to the program blocked though a blocking process 512.

If the User Level is greater than or exceeds the Restriction Level 508, then the Pass branch 514 is taken, program access is allowed 516, and the process exits 518.

If the program rating is more restrictive than the current level, e.g. if the video rating is "R" and the current level is only "NC-16", the result is regarded as "fail". In this case, the blocking procedure is applied 512. If the video rating is less restrictive than the current level, the program should not be blocked and is allowed access.

Returning back to the test 504 of whether the program is restricted, if the program is not restricted, the No branch 520 is taken. Next, it is determined whether the Metadata of the program can be accessed 522. If the program metadata can be accessed 524, then the program metadata is compared with the User Preference Database to determine an ad-hoc rating 526, and the rating level of the user and any restriction tested 508 as before.

In the ad-hoc rating step, the device compares the metadata, and any available V-Chip input (that will not be present for audio programming), of the program with the User Preference Database and determines the rating of the program based on the comparison. The comparison is done via matching of keywords in the metadata and those in the User Preference Database. If the result shows more of an "R" rating, the video is regarded as R-rated. If the result shows more of an "NC-16" rating, the video is regarded as NC-16. A negative result will label the video as "Not Rated", the least restricted rating. In the result of different outcomes between the V-Chip input and User Preference Database comparison, the latter would govern. This allows parents to better control the content of programming for their children.

If the program metadata cannot be accessed 522, then the No branch is taken 528 and program access is allowed 516.

The blocking procedure 512 may replace the restricted video with a still thumbnail image or other default blocking image, and set a blocking flag. Alternatively, any metadata associated with the program may be written to the User Preference Database as Restricted. Thus, when the video is later selected, it is known a restricted video is attempted to be accessed, and would offer a password challenge to unblock the video.

This entire procedure 500 is completed with each program change, so as to appropriately screen users who have insufficient access rights to certain programming content.

3.2 Restriction Release Widget

Figure 6:
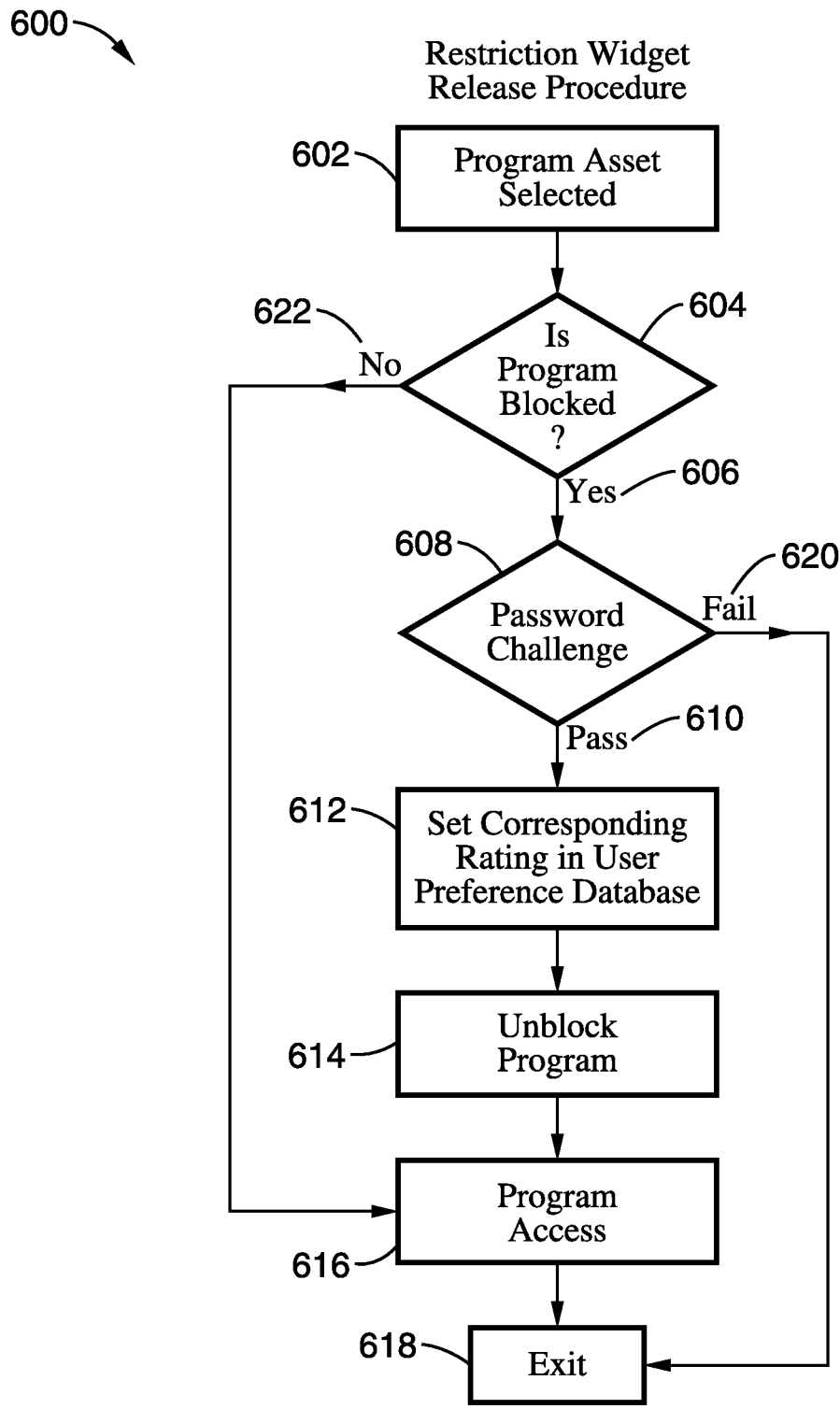
FIG. 6 is a flow chart of a Restriction Widget Release Procedure that allows entry of a password allowing access of a program that would otherwise be blocked.

Referring now to FIG. 6, a flow chart for temporarily accessing otherwise restricted programming content 600 is shown.

Here, a program asset is selected 602. Next, it is determined 604 whether the program has been blocked.

It may be determined whether a program is blocked by inspecting the thumbnail image and determining whether the blocking flag is set.

If the program is blocked 606, then a password challenge 608 is issued. The user must enter the correct pre-configured password in order to unblock the program. If the password challenge is successful, then the Pass 610 branch is taken, the User Preference Database is updated to rerate the program as the Current rating arrived at by comparing the User Preference Database with the program metadata, and the restriction to the program is deleted. The corresponding program thumbnail images are replaced with corresponding unblocked thumbnail images and the blocking flag unset.

In one embodiment, previously described, access is now allowed for successful password entry for just the current program. Alternatively, all programs with this Restriction level may be accessed for either this user session, or all such user sessions in the future.

Finally, the program is Unblocked 614, the Program Accessed 616, and the widget exited 618.

If the program was previously not blocked 604, then the No branch was taken 622, and the Program was Accessed 616.

If the user was unsuccessful in the Password Challenge 608, then the Fail branch 620 would be taken, and the widget exits 618 without allowing access to the program (as it was previously blocked).

Note that a variation or extension of the password challenge may be implemented to accept multiple passwords which correspond to different rating groups. In the password challenge, a successful challenge may be any pre-configured password that respectively corresponds to different groups.

E.g., if password A is entered, and it corresponds to a group with rating restriction up to NC 16, the new current rating will be NC-16. If Password B is entered and it corresponds to no restriction, then the new current rating will become no restriction. Additional checks and blocking procedures will have to be made to take care of the case whereby the new rating is more restrictive than the old rating, e.g. the old rating is NC-16 and the new rating is PG.

4.0 Recommendations

Refer now to FIG. 3, which shows how further processing of the Recommendation Queue may be accomplished 300. This process is executed after the assets list is loaded as shown previously in FIG. 1.

In FIG. 3, the recommendation queue is first loaded and processed 302. Then, the recommendation queue is sorted into separate categories of highly liked, partially liked, and disliked categories 304. Next, if 306 no recommendation is in the queue 308, then the process exits 310.

If there is a recommendation in the queue 312, then the recommendation sends a message to the user 314, whereupon it is again determined if there is a recommendation in the queue 306.

4.1 Recommendation Sorting

One way of sorting the recommendation queue 304 is to sort all recommendations at once into 3 separate queues of highly liked, partially liked, and disliked recommendations.

Another way of sorting the recommendation queue is to read the recommendations for relevant results and push irrelevant ones again to the back of the queue. E.g., if the user is searching for highly liked recommendations, programs with weak or negative recommendations will be pushed back onto recommendation queue, with those with highly liked recommendations being processed. This method may save much more memory space. Thus, those recommendations with weak and negative results will remain in the recommendation queue, and are still available.

Negative recommendations (as previously retained) may provide information to the user, such as telling the user to avoid these programs, or simply push these programs to the bottom of a presentation list so that those with better recommendations are presented first.

In another embodiment, only programs with highly liked recommendations are processed, and nothing is done with programs having partially liked or disliked recommendations, although these programming recommendations may also be used for other recommendation purposes. In this embodiment, partially liked or disliked recommendations are simply deleted.

4.2 Recommendation Messaging

The wandering widget object performs its recommendation message 314 when there is a recommendation to be made. In one embodiment, an interactive cartoon figure will move to the corresponding asset on the screen and inform the user that this program is recommended according to the user's preference. A verbal recommendation could also be included here with the cartoon figure, or separate from the cartoon figure. The recommended program is not limited to what is currently shown on the first page of the screen as the entire video list can be much too large to be shown on the screen in its entirety without scrolling. In this case, the screen will move to a page that contains the recommended program.

At this point, the user may simply "select" the program on their remote to access the program. The user does not need to navigate to the program in another manner simply to access it. A directional button press at any time in this process could be used to stop the recommendation process and the previous programming guide.

Upon exiting the wandering widget object, the navigation focus is returned to the first program on the screen so that the user may continue navigation from there.

It should be noted that because of the nature of a queue, program recommendations will be shown in chronological order, i.e., recommended programs on earlier pages will be recommended before those on later pages absent sorting of the recommendation queue. Alternatively, colors may be associated with each level of the 0-, 3-, and 5-star levels, such as red, yellow, and green, respectively for disliked, partially liked, and highly liked recommendations. Thus, if an asset list is displayed to the user, highlights such as the red, yellow, and green previously discussed may indicate programming that is respectively disliked, somewhat liked, and highly liked. In this manner, users may quickly navigate programming that would be of interest to them based on their prior experiences and ratings.

5. Further Implementation Details

There are two layers that may be related to the wandering widget object feature: the user Interface (UI) layer and the background working layer. The background working layer has been described above in section 2 as the processing used to generate recommendations and generate the wandering widget object.

5.1 User Interface (UI)

In the User Interface, an animated video object moves around the screen (hence called the wandering widget object) to provide: a) suggestions and recommendations (based on user's preferences and metadata of the currently accessed program); b) help; c) courteous "Incorrect Key" or "Feature Not Available" responses; and d) other interactive UI purposes such as enlarging a thumbnail of a video preview, idle entertainment, reminders, or a favorite TV program that is shortly up next in a TV channel, etc.

5.1.1 User Interface Recommendations

For example, if there is a match between the upcoming assets on sports and basketball with the user preferences for such programming, the animated object would then move towards that content and inform (visually, audibly, or both visually and audibly) the user that the content is related to sports and basketball.

When the animated object is recommending a specific program, the navigation focus may appear on that program, so that the user only has to press "Select" on the remote to access the program. For this user interaction to occur successfully, the duration of each recommendation has to be of a reasonable length, perhaps 5-60 seconds. This duration may also be user configurable.

The recommendation sequence stops when it reaches the end of the list of recommended programs, or if the user presses any key on the remote, thereby returning navigation control to the user.

If the list of recommendations is exhausted, and there is no user input, the navigation focus may be returned to the first item on the screen.

5.1.2 Help

When a "Help" key is depressed, the wandering widget object may offer a help message related to the active window, or object on the window. The message may be given visually, audibly, or both visually and audibly to the user.

Other pop-up displays, such as weather, email, other application alerts, RSS (Really Simple Syndication) feeds, etc. may also utilize the wandering widget object manner of interactive User Interface (UI) display.

For example, if the user is in the video guide, a "Help" request may bring up help topics like "Press Home for the Graphical User Interface. Press "+" to select. Press "Display"

to display the message contents of a video content. Press "Options" to bring up the Options Menu".

If the user is in the Options Menu, a "Help" request will tell the user the purpose of each item on the list, e.g., the sort feature, etc.

The user can switch the "Help" feature on and off anytime, by pressing a button on the remote. If the "Help" feature is turned on, it will remain "on" until it is turned off.

The recommendation feature may generally have priority over the "Help" feature.

The user can also scroll through the "Help" options to quickly move to one of interest or to redisplay one that has passed.

5.1.3 Incorrect Key Response:

If the user enters a set of nonsensical commands, the "Help" feature aspect of the wandering widget object may be triggered to assist the user with their current predicament.

If an incorrect key is pressed, the wandering widget object may tell the user that an incorrect key has been pressed, or the feature is not yet available.

If help is turned on, the available keys may be redisplayed. If help is turned off, the animated object will suggest the user to turn on "Help" to look at available options.

6. Conclusion

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of interacting with a user, comprising:
    collecting a set of user preferences for a user into a user preference database;
    providing a metadata stream associated with a program, comprising metadata for the program;
    comparing the metadata stream with the set of user preferences to form a comparison; and
    outputting a message to the user if the comparison indicates that the metadata stream matches one or more elements of the set of user preferences;
    wherein collecting the set of user preferences for the user comprises determining a percentage of time the program was perceived by the user prior to changing to a different audiovisual input;
    wherein the percentage of time the audiovisual input was perceived is calculated by dividing an amount of time that the audiovisual input was perceived by the user by a total length of time the program was available; and
    wherein the message is a verbal recommendation; and
    executing instructions on a computer for performing user preference acquisition comprising:
    (a) looping until the program is played, then unsetting a wait flag; and
    (b) if the program has been played for a percentage of time <30%, then:
        (i) setting the wait flag;
        (ii) queuing program metadata as a 0-Star entry in a user preference database;
        (iii) looping until the wait flag is not set;
        (iv) posting the queued metadata to the user preference database; and (v) returning to step (a);
    (c) if the program has been played for a percentage of time <70%, then:
        (i) setting the wait flag;
        (ii) queuing program metadata as a 3-Star entry in the user preference database;
        (iii) looping until the wait flag is not set;
        (iv) posting the queued metadata to the user preference database; and (v) returning to step (a);
    (d) assuming that the program has been played to completion, then:
        (i) if the user does not want to rate the program, then queuing program metadata as a 5-Star entry in the user preference database;
        (ii) if the user rates the program as disliked, then queuing program metadata as the O-Star entry in the user preference database;
        (iii) if the user rates the program as partially liked, then queuing program metadata as the 3-Star entry in the user preference database;
        (iv) if the user rates the program as liked, then queuing program metadata as the 5-Star entry in the user preference database;
        (v) posting the queued metadata to the user preference database; and (vi) returning to step (a).

2. The method of claim 1, wherein the percentage of time is determined by a perception by the user that was physically present.

3. The method of claim 2, wherein the perception by the user comprises being available for perception by the user, but not necessarily a physically present perception by the user.

4. The method of claim 2, wherein the percentage of time the program was perceived is maintained for one or more concurrently available audiovisual inputs, thereby providing for partial viewing of the inputs.

5. The method of claim 2, wherein the perception by the user comprises viewing of an active window in a potentially multi-windowed device.

6. The method of claim 5, wherein the active window in the potentially multi-windowed device is a single window.

7. The method of interacting with a user of claim 2, comprising:
    using the percentage of time the program was perceived by the user to select a binned rating attribute in the user preference database; and
    inputting the metadata associated with the program into the user preference database as associated with the binned rating attribute.

8. The method of interacting with a user of claim 7, comprising allowing the user to override the binned rating attribute of the user preferences.

9. The method of claim 2, further comprising:
    loading a list of assets available for user perception,
    wherein each of the assets has an independent metadata stream; and
    comparing at least one of the metadata streams of the assets, with a set of preferences determined from the user preference database for the user, to create one or more user recommendations.

10. The method of claim 9, further comprising:
ordering the one or more user recommendations; and
forming the message regarding the program corresponding to the user recommendation as a restriction message.

11. The method of claim 10, further comprising blocking the program that corresponds to the restriction message, thereby forming a blocked input.

12. The method of claim 11, further comprising releasing the blocked input upon a successful user response to a password query.

13. The method of claim 1, wherein the audiovisual input program is selected from a group of audiovisual inputs consisting of: an audio input, a video input, a video input with an associated audio input, an audio input with a corresponding video display, and one or more of the foregoing.

14. The method of claim 1, wherein the metadata stream comprises a closed caption data stream for the program.

15. The method of claim 1, wherein the metadata stream comprises a speech recognition output stream for an audio component of the program.

16. The method of claim 1, wherein the metadata stream comprises a video recognition output stream for a video component of the program.

17. A non-transitory computer readable medium comprising the instructions for performing the method of claim 1.

18. A user preference apparatus comprising the computer and instructions for performing the method of claim 1.

19. An audiovisual device, comprising: an audio, video, or audiovisual output device capable of receiving and processing a respective audio, video, or audiovisual input signal, the input signal comprising a program;
a computer; and
instructions executable on the computer for performing steps comprising:
processing a metadata stream associated with the respective audio, video, or audiovisual input signal, the metadata stream comprising metadata for the input signal;
generating user preferences; and
outputting to a user, one or more messages based on one or more comparisons of the user preferences and metadata stream;
wherein the one or more messages are verbal recommendations; and
wherein the generating user preferences step comprises:
collecting a set of user preferences for a user into a user preference database;
wherein collecting the set of user preferences for the user comprises determining a percentage of time the audiovisual input was perceived by the user prior to changing to a different program; and
wherein the percentage of time the audiovisual input was perceived is calculated by dividing an amount of time that the audiovisual input was perceived by the user by a total length of time the audiovisual input was available; and
performing user preference acquisition steps on the computer, the acquisition steps comprising:
(a) looping until the program is played, then unsetting a wait flag; and
(b) if the program has been played for the percentage of time <30%, then:
(i) setting the wait flag;
(ii) queuing program metadata as a O-Star entry in a user preference database;
(iii) Looping until the wait flag is not set;
(iv) posting the queued metadata to the user preference database; and
(v) returning to step (a);
(c) if the program has been played for a percentage of time <70%, then:
(i) setting the wait flag;
(ii) queuing program metadata as a 3-Star entry in the user preference database;
(iii) looping until the wait flag is not set;
(iv) posting the queued metadata to the user preference database; and
(v) returning to step (a);
(d) assuming that the program has been played to completion, then:
(i) if the user does not want to rate the program, then queuing program metadata as a 5-Star entry in the user preference database;
(ii) if the user rates the program as disliked, then queuing program metadata as the 0-Star entry in the user preference database;
(iii) if the user rates the program as partially liked, then queuing program metadata as the 3-Star entry in the user preference database;
(iv) if the user rates the program as liked, then queuing program metadata as the 5-Star entry in the user preference database;
(v) posting the queued metadata to the user preference database; and
(vi) returning to step (a).

20. The audiovisual device of claim 19, further comprising instructions executable on the computer for providing a wandering widget that fades into existence when one or more messages are to be communicated to the user.

21. The audiovisual device of claim 19, further comprising instructions executable on the computer for blocking the respective audio, video, or audiovisual input signal based on one or more of the messages.

22. The audiovisual device of claim 21, further comprising instructions executable on the computer for selectively unblocking the blocked respective audio, video, or audiovisual input signal based on a successful password query.

* * * * *